(12) United States Patent
Ryu et al.

(10) Patent No.: US 9,349,155 B2
(45) Date of Patent: May 24, 2016

(54) COMPUTING APPARATUS AND METHOD USING X-Y STACK MEMORY

(75) Inventors: Soo-Jung Ryu, Hwaseong-si (KR); Sung-Bae Park, Seongnam-si (KR); Woong Seo, Hwaseong-si (KR); Young-Chul Cho, Yongin-si (KR); Jeong-Wook Kim, Seongnam-si (KR); Moo-Kyoung Chung, Yongin-si (KR); Ho-Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 13/171,772

(22) Filed: Jun. 29, 2011

(65) Prior Publication Data
US 2012/0113128 A1 May 10, 2012

(30) Foreign Application Priority Data
Nov. 10, 2010 (KR) .................. 10-2010-0111743

(51) Int. Cl.
*G06T 1/60* (2006.01)
*G06F 13/00* (2006.01)
*G06F 12/02* (2006.01)

(52) U.S. Cl.
CPC ........................................ *G06T 1/60* (2013.01)

(58) Field of Classification Search
None
See application file for complete search history.

(56) References Cited

U.S. PATENT DOCUMENTS

| 4,535,427 | A | 8/1985 | Jiang |
| 5,410,513 | A * | 4/1995 | Masuda et al. ................. 365/236 |
| 5,596,684 | A | 1/1997 | Ogletree et al. |
| 5,699,460 | A | 12/1997 | Kopet et al. |
| 5,724,540 | A | 3/1998 | Kametani |
| 5,737,768 | A * | 4/1998 | Lloyd ............................ 711/173 |
| 7,557,803 | B2 | 7/2009 | Furukawa et al. |
| 7,852,343 | B2 | 12/2010 | Tanaka et al. |
| 2007/0174513 | A1* | 7/2007 | Wrigley et al. .................. 710/52 |
| 2008/0050024 | A1* | 2/2008 | Aguera Y Arcas ............ 382/232 |
| 2008/0114907 | A1* | 5/2008 | Brokenshire et al. ........... 710/28 |

FOREIGN PATENT DOCUMENTS

| CN | 1691018 A | 11/2005 |
| JP | 2003-186740 | 7/2003 |
| JP | 2009-271668 | 11/2009 |
| KR | 10-2006-0123632 | 12/2006 |
| KR | 10-2008-0051053 | 6/2008 |

OTHER PUBLICATIONS

Search Report issued for corresponding European Application No. 11188431.8-2218 on Jan. 23, 2012 (8 pages).

(Continued)

*Primary Examiner* — Kee M Tung
*Assistant Examiner* — Frank Chen
(74) *Attorney, Agent, or Firm* — NSIP Law

(57) ABSTRACT

A computing apparatus is provided. The computing apparatus includes a memory unit configured to have an address space defined as a multidimensional space having at least two axes, and a memory access unit configured to include a first pointer register storing a first pointer pointing to a row corresponding to the first axis and a second pointer register storing a second pointer pointing to a column corresponding to the second axis.

11 Claims, 4 Drawing Sheets

(56) References Cited

OTHER PUBLICATIONS

Knuth, D E. "2.2 Linear Lists." Jan. 1, 1997, the Art of Computer Programming. vol. 1: Fundamental Algorithms. Addison-Wesley, Boston, MA: (17 pages).

European Examination Report dated Sep. 24, 2013 in counterpart European Patent Application No. 11188431.8 (7 pages in English).

Chinese Office Action issued on Aug. 26, 2015, in counterpart Chinese Application No. 201110186412.5 (14 pages in English, 10 pages in Chinese).

Denning, Peter J. "The locality principle." Communications of the ACM vol. 48 Issue 7 Designing for the mobile device, (Jul. 2005). (14 pages, in English).

R. Pinho, et al. "Seeing through the window: pre-fetching strategies for out-of-core image processing algorithms." Medical Imaging. International Society for Optics and Photonics, (2008). (8 pages, in English).

European Office Action issued on Oct. 22, 2015 in counterpart European Application No. 11188431.8. (6 pages, in English).

\* cited by examiner arr [ ] = {$d_0, d_1, d_2, d_3,$
$d_4, d_5, d_6, d_7,$
$d_8, d_9, d_{10}, d_{11},$
$d_{12}, d_{13}, d_{14}, d_{15},$}

COMPUTING APPARATUS AND METHOD USING X-Y STACK MEMORY

CROSS-REFERENCE TO RELATED APPLICATION(S)

This application claims the benefit under 35 U.S.C. §119(a) of Korean Patent Application No. 10-2010-0111743, filed on Nov. 10, 2010, in the Korean Intellectual Property Office, the entire disclosure of which is incorporated herein by reference for all purposes.

BACKGROUND

1. Field

The following description relates to a memory architecture for processing image data.

2. Description of the Related Art

Image data is generally represented by a two-dimensional (2D) array of a plurality of pixel values. Due to properties of the image data, adjacent pixel values are often processed together. For example, in a case of image compression, which is a representative image processing technique, adjacent pixel values in a horizontal or a vertical direction tend to be processed sequentially.

In order to process the image data, each pixel value of the image data needs to be loaded onto a predefined memory region accessible by an image processing device. The predefined memory region is generally defined as a one-dimensional (1D) space or a one-dimensional (1D) array. Thus, a 2D array of pixel values of the image data is loaded onto the predefined memory region as a 1D array data.

Then, in order for the image processing device to access the image data in a column direction, additional address calculation is required. However, the additional address calculation may attribute for a greater overhead than for overhead attributed to processing the image data alone. In addition, since a memory access pattern for accessing the image data in a row direction differs from a memory access pattern for accessing the image data in a column direction, it requires a great deal of overhead to properly access the image data loaded into the 1D array.

SUMMARY

In one general aspect, a computing apparatus is provided. The computing apparatus includes a memory unit configured to have an address space defined as a multidimensional space having at least two axes, and a memory access unit configured to include a first pointer register storing a first pointer pointing to a row corresponding to the first axis and a second pointer register storing a second pointer pointing to a column corresponding to the second axis.

In another general aspect, a computing apparatus is provided. The computing apparatus includes a memory unit configured to have an address space defined as a multidimensional space having at least two axes and to store data therein or output data therefrom in a last-in first-out (LIFO) manner, the at least two axes including X and Y axes, a memory allocation unit configured to allocate the address space to 2D array data by allocating row data of the 2D data along the X axis and allocating column data of the 2D data along the Y axis, and a memory access unit configured to include a first pointer register storing a first pointer pointing to a row corresponding to the X axis and a second pointer register storing a second pointer pointing to a column corresponding to the Y axis, to pop data from the memory unit or push data onto the memory unit in a direction of the row by increasing or decreasing a value of the second pointer while a value of the first pointer remains unchanged, and to pop data from the memory unit or push data onto the memory unit in a direction of the column by increasing or decreasing the value of the first pointer while the value of the second pointer remains unchanged.

In another general aspect, a computing method is provided. The computing method includes allocating an address space of a memory, the address space being defined as a multidimensional space having at least two axes, to image data having a 2D array structure, the at least two axes including X and Y axes, and accessing row data of the image data along the X axis by increasing or decreasing a value of a second pointer while a value of a first pointer remains unchanged, or accessing column data of the image data along the Y axis by increasing or decreasing the value of the first pointer while the value of the second pointer remains unchanged, the first pointer pointing to a row corresponding to the X axis and the second pointer pointing to a column corresponding to the Y axis.

Other features and aspects may be apparent from the following detailed description, the drawings, and the claims.

Figure 1:
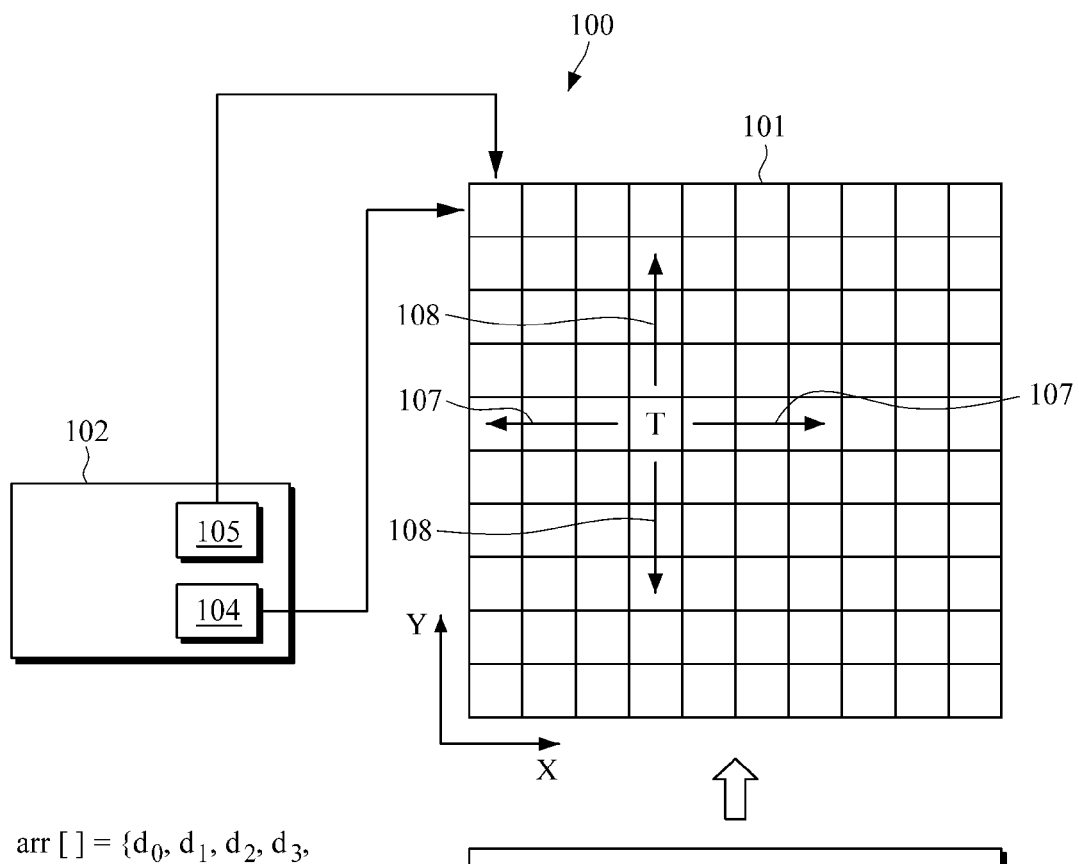
FIG. 1 is a diagram illustrating an example of a computing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a computing apparatus.

Referring to FIG. 1, a computing apparatus 100 includes a memory unit 101, a memory access unit 102, and a memory allocation unit 103.

The memory unit 101 may have an address space, which may be defined as a multidimensional space having at least two axes. For example, the memory unit 101 may have a two-dimensional (2D) address space having X and Y axes. Each location in the 2D address space may be defined by a 2D vector address. A particular location 106 (not shown) in the 2D address space may be designated by a 2D vector address having X and Y coordinates, for example, (X, Y).

The memory unit 101 may be a stack memory to/from which data may be written/read in a last-in first-out (LIFO) manner. A stack may be a linear data structure where items can be added or removed at only one end called top, and may be characterized by two fundamental operations: pop and push. The pop operation may remove an item from the top of the stack, and the push operation may add an item to the top of the stack. When the push operation is performed, a new stack may be obtained by adding an item to the top of an existing stack. When the pop operation is performed, a new stack may be obtained by deleting an item from the top of the existing stack.

Since the address space in the memory unit 101 is defined as a multidimensional space, the memory unit 101 may be configured to have a 2D stack structure. For example, the top of a stack may have both X and Y coordinates. Data may be sequentially pushed onto or popped from the memory unit 101 along the direction of the X axis (i.e., a row direction) from a current top T of the stack, as indicated by arrows 107, or along the direction of the Y axis (i.e., a column direction) from the current top T of the stack, as indicated by arrows 108.

The memory unit 101 may be an exclusive memory that can be quickly accessed by a device for processing 2D array data (such as image data) for, for example, a digital signal processing chip or a coarse-grained array. For example, data present in an external memory or a disc may be downloaded into the memory unit 101 to be processed by the device.

The memory access unit 102 may process data. The memory access unit 102 may access the memory unit 101 to process the data present in the memory unit 101. For example, the memory access unit 102 may push data onto or pop data from the memory unit 101. The memory access unit 102 may include a first stack pointer register 104 and a second stack pointer register 105.

The first stack pointer register 104 may store a first stack pointer pointing to a location on the X axis of the 2D address space in the memory unit 101. The second stack pointer register 105 may store a second stack pointer pointing to a location on the Y axis of the 2D address space in the memory unit 101. For example, if each location in the 2D address space in the memory unit 101 is defined by X and Y coordinates, for example, (X, Y), the X coordinate may be stored in the first stack pointer register 104, and the Y coordinate may be stored in the second stack pointer register 105.

The memory access unit 102 may access the memory unit 101 in the row direction by gradually increasing or decreasing the value of the second stack pointer, while the value of the first stack pointer remains unchanged. The memory access unit 102 may also access the memory unit 101 in the column direction by gradually increasing or decreasing the value of the first stack pointer, while the value of the second stack pointer remains unchanged. The amount by which the memory access unit 102 increases or decreases the value of the first or second stack pointer at a time may be set equivalent to a size of an unit address.

The memory access unit 102 may be, but is not limited to, a device for processing 2D array data, such as a digital signal processor chip or a coarse-grained array.

The memory allocation unit 103 allocates a memory region in the memory unit 101 to 2D array data. Since the address space in the memory unit 101 is defined as a multidimensional space, the memory allocation unit 103 may allocate rows of 2D array data along the X-axis of the address space in the memory unit 101, and may allocate columns of the 2D array data along the Y-axis of the address space in the memory unit 101. For example, the memory allocation unit 103 may allocate memory addresses $(X_0, Y_0)$, $(X_1, Y_0)$, $(X_2, Y_0)$, $(X_3, Y_0)$, $(X_0, Y_1)$, and $(X_3, Y_3)$ to store data $d_0$, $d_1$, $d_2$, $d_3$, $d_4$, and $d_{15}$, respectively.

The memory allocation unit 103 may be, but is not limited to, a whole compiler or a part of a compiler for allocating address space to each variable in a program code for processing 2D array data.

Figure 2:
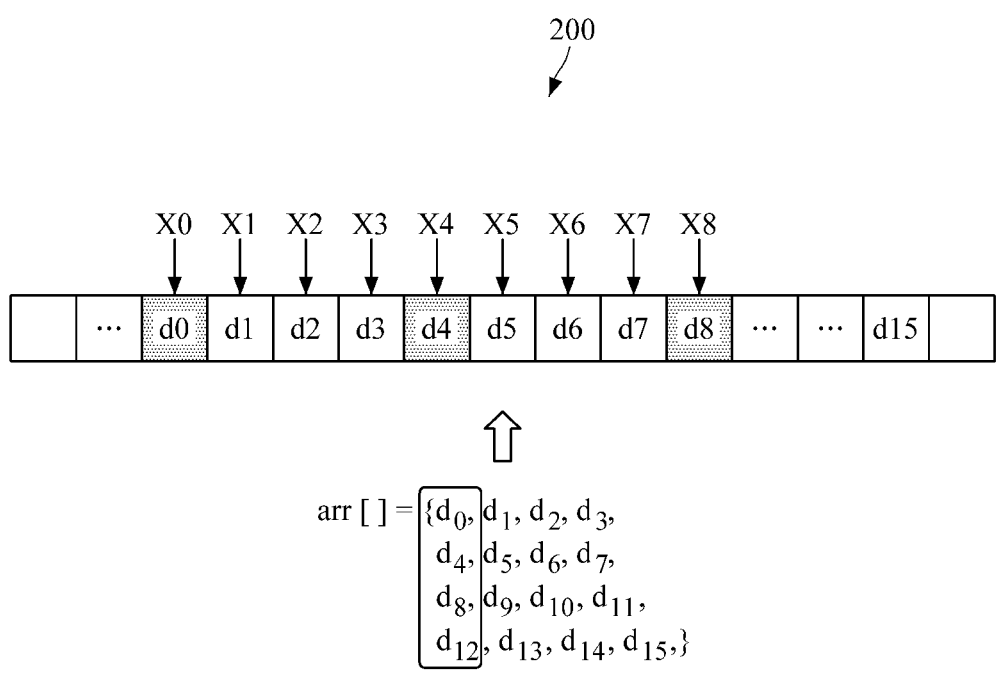
FIG. 2 is a diagram illustrating an example of a memory having a one-dimensional (1D) address space.

FIG. 2 illustrates an example of a stack memory having a one-dimensional (1D) address space.

Referring to FIG. 2, each location in a 1D address space 200 may be defined by a 1D address. For example, each location in the 1D address space 200 may be defined by an X coordinate such as, for example, $X_0$, $X_1$, or $X_2$.

The allocation of a 2D array of data $d_0$ through $d_{15}$ (such as, for example, image data) to the 1D address space 200 will hereinafter be described in detail. Even though the data $d_0$ through $d_{15}$ are arrayed two-dimensionally, they may be treated as 1D array data because they are subject to allocation to the 1D address space 200. For example, memory addresses $X_0$, $X_1$, $X_2$, and $X_3$ may be sequentially allocated to data $d_0$, $d_1$, $d_2$, and $d_3$, respectively, in one row. Then, memory address $X_4$ may be allocated to data $d_4$, which is located in a row directly below the row including the data $d_0$, $d_1$, $d_2$, and $d_3$. In this case, in order to process data $d_0$ and then data $d_4$, a jump from the memory address $X_0$ to the memory address $X_4$ is required, and thus, an addition operation for adding a predefined value $\alpha$ to the memory address $X_0$ needs to be additionally performed. However, additional computations for calculating a memory address may incur additional overhead.

Figure 3:
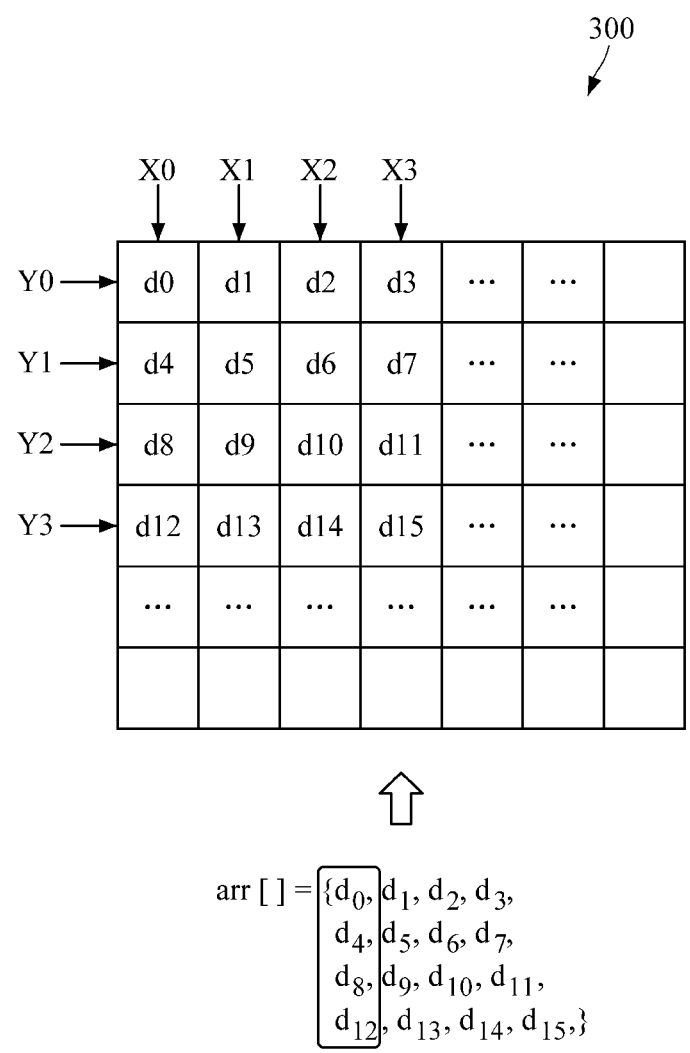
FIG. 3 is a diagram illustrating an example of a memory having a two-dimensional (2D) address space.

FIG. 3 illustrates an example of a stack memory having a 2D address space.

Referring to FIG. 3, each location in a 2D memory space 300 may be defined by a 2D address. For example, each location in the 2D memory space 300 may be defined by a vector or a pair of coordinates, for example, $(X_0, Y_0)$, $(X_1, Y_0)$, $(X_0, Y_1)$ or $(X_1, Y_1)$.

The allocation of a 2D array of data $d_0$ through $d_{15}$ (such as, for example, image data) to the 2D address space 300 will hereinafter be described in detail. Since the data $d_0$ through $d_{15}$ may be arrayed two-dimensionally, they may be readily mapped to corresponding locations in the 2D memory space 300. For example, memory addresses $(X_0, Y_0)$, $(X_1, Y_0)$, $(X_2, Y_0)$, $(X_3, Y_0)$, $(X_0, Y_1)$, and $(X_1, Y_1)$ may be allocated to data $d_0$, $d_1$, $d_2$, $d_3$, $d_4$, and $d_5$, respectively.

The mapping of the data $d_0$ through $d_{15}$ to the 2D address space 300 may be performed at a time of writing of a program code by a programmer, or may be performed later by a compiler or the memory allocation unit 103.

When the data $d_0$ through $d_{15}$ are allocated to the 2D address space 300, as shown in FIG. 3, the data $d_0$, $d_4$, $d_8$, and $d_{12}$ may be sequentially processed by gradually increasing the value of a stack pointer representing the Y-axis while the value of a stack pointer representing the X-axis remains unchanged. For example, referring to FIG. 1, the memory access unit 102 may sequentially access the memory addresses $(X_0, Y_0)$, $(X_0, Y_1)$, $(X_0, Y_2)$, and $(X_0, Y_3)$ by gradually increasing the Y coordinate of the first stack pointer stored in the first stack pointer register 104 while the X coordinate of the second stack pointer stored in the second stack pointer 105 remains unchanged. In this case, the amount by which the Y coordinate of the first stack pointer may be set equivalent to the size of a unit address (e.g., +1). Therefore, the memory access unit 102 may access each row of the 2D array data mapped to the 2D memory space 300, without requiring additional computation, simply by gradually increasing or decreasing the value of a stack pointer representing the Y-axis.

In order to process the data $d_1$, $d_5$, $d_9$, and $d_{13}$ after the processing of the data $d_0$, $d_4$, $d_8$, and $d_{12}$, the value of the second stack pointer may be fixed to the X coordinate $X_1$, and the value of the first stack pointer may be gradually increased such that the memory addresses $(X_1, Y_0)$, $(X_1, Y_1)$, $(X_1, Y_2)$, and $(X_1, Y_3)$ can be sequentially accessed. Similarly, in order to process row data such as $d_0$, $d_1$, $d_2$, and $d_3$, the value of the first stack pointer may be fixed to the Y coordinate $Y_0$, and the value of the second stack pointer may be gradually increased such that the memory addresses $(X_0, Y_0)$, $(X_1, Y_0)$, $(X_2, Y_0)$, and $(X_3, Y_0)$ can be sequentially accessed. The 2D address space 300 may be defined based on a stack structure, and may be accessed in a LIFO manner through pop and push operations.

2D array data such as, for example, image data is generally processed in units of rows or columns thereof. For example, compression of image data using an H.264 luma prediction algorithm may involve accessing the image data in the row or column direction for vertical or horizontal filtering.

Therefore, a pop or push operation may be easily performed on image data mapped to an X-Y stack memory having the 2D address space 300 simply by adjusting a pointer corresponding to the row or column direction. Thus, the image data can be quickly processed without incurring additional overhead. A memory access pattern for accessing the image data in the row direction and a memory access pattern for accessing the image data in the column direction may be configured identically.

Figure 4:
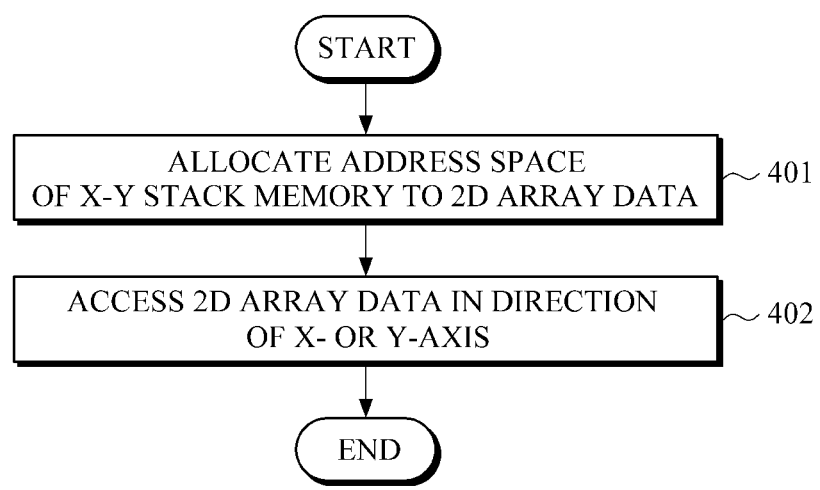
FIG. 4 is a flowchart illustrating an example of a computing method.

FIG. 4 illustrates an example of a computing method, i.e., an example of how to process 2D array data using the computing apparatus 100 shown in FIG. 1.

Referring to FIGS. 1 and 4, an address space in an X-Y stack memory may be allocated to 2D array data (401). The address space may be a 2D memory zone operating in a LIFO manner and having X and Y axes. For example, when compiling program code for processing 2D array data, the memory allocation unit 103 may map rows and columns of the 2D array data to corresponding locations in the memory unit 101. The mapping of the 2D array data to the memory unit 101 may be performed at times other than during compilation, such as at a time of writing of a program code, using various methods other than those set forth herein.

Thereafter, the 2D array data is accessed in the direction of the X-axis or the Y-axis (402). For example, the memory access unit 102 may perform a pop or push operation on the 2D array data by gradually increasing or decreasing the value of the second stack pointer stored in the second stack pointer register 105 while the value of the first stack pointer stored in the first stack pointer register 104 remains unchanged. Alternatively, the memory access unit 102 may perform a pop or push operation on the 2D array data by gradually increasing or decreasing the value of the first stack pointer stored in the first stack pointer register 104 while the value of the second stack pointer stored in the second stack pointer register 105 remains unchanged.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code or source code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing apparatus comprising:
a memory configured to comprise an address space defined as a multidimensional space comprising two axes;
a memory allocator implemented by a processor and configured to allocate the address space, as one-dimensional (1D) arrays thereof, to two-dimensional (2D) array data by allocating row data of the 2D data along a first axis and allocating column data of the 2D data along a second axis, wherein the memory allocator allocates the address space using 2D vector addresses corresponding to sequential pieces of data arranged in accordance with the 1D arrays; and
a memory accessor implemented by a processor and configured to include a first pointer register storing a first pointer pointing to a row corresponding to the first axis and a second pointer register storing a second pointer pointing to a column corresponding to the second axis,
wherein the memory accessor is configured to access the memory in accordance with a size of each of the 1D arrays, in which the memory accessor pops data from or pushes data onto the memory in a direction of the row by increasing or decreasing a value of the second pointer by a degree of the size of each of the 1D arrays while a value of the first pointer remains unchanged, and pops data from or pushes data onto the memory in a direction of the column by increasing or decreasing the value of the first pointer by a degree of the size of each of the 1D arrays while the value of the second pointer remains unchanged.

2. The computing apparatus of claim 1, wherein the memory is a last-in first-out (LIFO)-based stack memory.

3. The computing apparatus of claim 2, wherein the first pointer register is a first stack pointer register storing a Y coordinate of a top of the stack memory and the second pointer register is a second stack pointer register storing an X coordinate of the top of the stack memory.

4. The computing apparatus of claim 1, wherein the first pointer register is separate from the second pointer register.

5. A computing apparatus comprising:
a memory configured to comprise an address space defined as a multidimensional space comprising an X axis and a Y axis and to store data therein or output data therefrom in a LIFO manner;
a memory allocator implemented by a processor and configured to allocate the address space to 2D array data by allocating row data of the 2D data along the X axis and allocating column data of the 2D data along the Y axis, wherein the memory allocator allocates the address space, as one-dimensional (1D) arrays thereof, using 2D vector addresses corresponding to sequential pieces of data arranged in accordance with the 1D arrays; and a memory accessor implemented by a processor and configured to access the memory in accordance with a size of each of the 1D arrays, in which the memory accessor includes first pointer register storing a first pointer pointing to a row corresponding to the X axis and a second pointer register storing a second pointer pointing to a column corresponding to the Y axis, to pop data from or push data to the memory in a direction of the row by increasing or decreasing a value of the second pointer by a degree of the size of each of the 1D arrays while a value of the first pointer remains unchanged, and to pop data from or push data to the memory in a direction of the column by increasing or decreasing the value of the first pointer by a degree of the size of each of the 1D arrays while the value of the second pointer remains unchanged.

6. The computing apparatus of claim 5, wherein the memory is a stack memory comprising image data comprising a 2D array structure configured to write thereto or configured to read therefrom.

7. The computing apparatus of claim 6, wherein the memory accessor is a digital image processor configured to process the image data in a row or column direction of the image data.

8. The computing apparatus of claim 5, wherein the first pointer register is separate from the second pointer register.

9. A computing method comprising:

allocating, as one-dimensional (1D) arrays, an address space of a memory defined as a multidimensional space comprising an X axis and a Y axis to image data comprising a 2D array structure, wherein each location in the address space has a 2D vector address corresponding to a respective sequential piece of data arranged in a row or a column of the address space in accordance with the 1D array; and accessing, in accordance with a size of each of the 1D arrays, row data of the image data along the X axis by increasing or decreasing a value of a second pointer by a degree of the size of each of the 1D arrays while a value of a first pointer remains unchanged, or accessing, in accordance with the size each of the 1D arrays, column data of the image data along the Y axis by increasing or decreasing the value of the first pointer by a degree of each of the 1D arrays while the value of the second pointer remains unchanged, the first pointer pointing to a row corresponding to the X axis and the second pointer pointing to a column corresponding to the Y axis, wherein the allocating of the address space and the accessing of the row data of the image data are each performed by a processor.

10. The computing method of claim 9, wherein the memory is a stack memory comprising data written thereto or read therefrom in a LIFO manner.

11. The computing method of claim 9, wherein the first pointer is separate from the second pointer.

* * * * *